Patented Nov. 1, 1927.

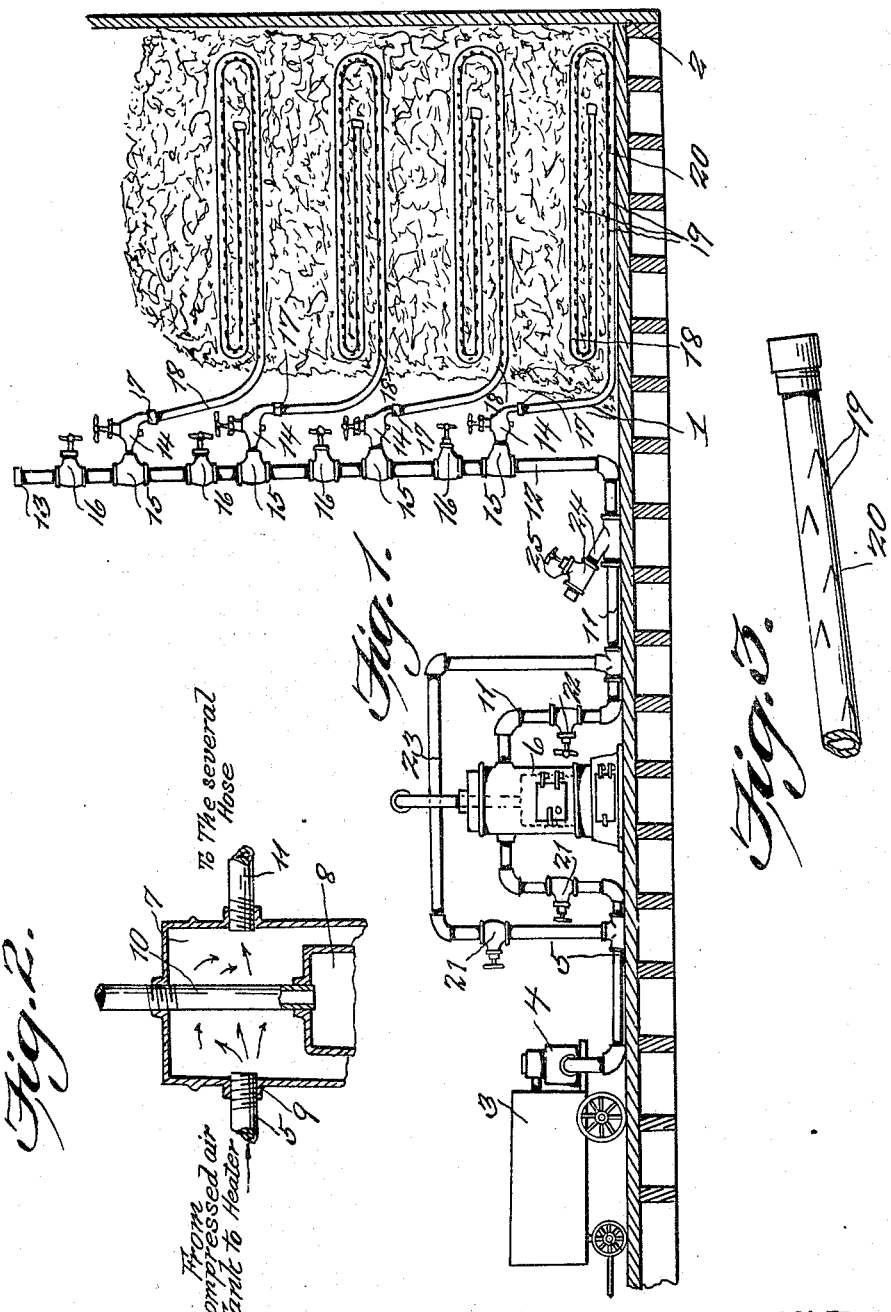

1,647,863

UNITED STATES PATENT OFFICE.

HARRY F. GALBRAITH, OF PHILADELPHIA, PENNSYLVANIA.

APPARATUS AND METHOD FOR CURING LEGUME.

Application filed March 11, 1927. Serial No. 174,576.

The present invention relates to an apparatus and a method for curing legume and more especially alfalfa, oats and the like.

At present there are artificial methods and apparatus for curing legume, such as alfalfa and other similar products, but such apparatus and methods are expensive, the small farmer being unable to avail himself of such apparatus. Also legume is allowed to cure in the field, but this method is unsatisfactory as it consumes considerable time. On the other hand farmers quite often lose the entire crop of alfalfa or other legume, due to the fact that when it is ready to cut weather conditions prevent it from being cut, hence it is broken and damaged considerably, that is beaten down.

It is the purpose of the present invention to avoid these contingencies, and make it possible to cure alfalfa and other legume with less handling, without risk of losses due to weather conditions, saving the entire crop as well as considerable time and labor and with minimum expense, it being possible with this particular apparatus and method to permit the alfalfa or other legume to be cut at the proper time, in fact at any convenient time, and particularly before it loses its entire strength, and especially before bad weather sets in at the end of the season.

Another purpose is to provide an apparatus and method less expensive than any other known method such as those involving the use of expensive apparatus, and enabling the crop to be cured in the mow.

It is understood that the particulars herein given are in no way limitive, and that while still keeping within the scope of the invention, any desired modification of details and proportions may be made in the construction of the apparatus and method according to circumstances.

The invention comprises further features and combination of parts to be hereinafter set forth, shown in the drawings and claimed.

In the drawings:

Figure 1 is a view diagrammatically showing the construction of an apparatus for artificially curing alfalfa and other legume.

Figure 2 is an enlarged detail sectional view of the upper part of the heater, showing the chamber through which the compressed air passes to be heated, and then conveyed to the several coils of hose.

Figure 3 is a detail view of a portion of one of the hose, showing the cuts therein, which permit the escape of the heated compressed air.

Referring to the drawings—1 identifies the mow of a barn 2 and 3 is a conventional type of air compressor provided with a tank 4 of any approved construction for receiving the compressed air, there being a conduit or pipe 5 leading from the tank 4 for conveying compressed air to the heater.

The heater 6 may be any approved construction provided with a chamber 7 into which the compressed air enters, to be heated by the heat rising from the heat dome 8. The pipe or conduit 5 enters the wall of the heater as at 9, so that the compressed air can be quickly heated. A suitable pipe 10 leading from the heat dome passes through the chamber 7 and through the top of the heater and may terminate at any suitable location, so as to carry off the heat to the atmosphere.

Leading from the heater and communicating with the chamber 7 is a pipe or conduit 11, and which merges into a standpipe 12, which rises adjacent to the mow 1 of the barn. This standpipe may be any height, according to the height of the mow, and wherever it might terminate, its upper end is closed by a cap 13.

A plurality of approved spigots 14 with valves are operatively connected at 15 to the standpipe, there being a plurality of approved valves 16 also carried by the standpipe 12. It will be noted that the valves 16 are intermediate the spigots 14.

Operatively connected to the spigots in any approved manner as at 17 is a plurality of hose 18. Each hose may be any length, according to the size of coil into which the hose is designed to be formed, when placing the alfalfa or other legume in the mow. Each hose is provided with a plurality of splits or cuts 19, which may be any formation, preferably V-shaped as shown in Figure 3, thereby providing V-shaped flaps 20 which act to close the slits when the air is shut off.

In curing alfalfa or other legume it is the aim to deposit a layer or quantity of alfalfa on the floor of the mow, and then arrange a hose 18 in a suitable coil on the first layer of material, and then deposit a substantial quantity of alfalfa on top. It will be noted that in Figure 1 the hose is shown as being in an elongated coil, and it appears that it is in vertical position. However, this is merely a diagrammatic showing of the coil, for in reality the coil of each hose lies horizontally.

After depositing a supply of alfalfa on top of the first layer, another hose in coil form is arranged, and then an additional deposit of alfalfa placed on top of the second hose. In the operation the lowermost spigot 14 is partly closed (previous to which it had been fully open allowing a substantial supply of compressed heated air to escape through the slits 19 curing the alfalfa) and then the lowermost valve 16 is fully opened and the next spigot 14 is also entirely open allowing heated compressed air to pass through the second hose and escape through its slits or cuts 19. After the heated compressed air is allowed to escape through the second hose for a substantial time, a third hose is then arranged in the coil on the last deposit of alfalfa, and an additional supply on top of the third hose. The second spigot is then closed to permit a small quantity of compressed heated air to escape into the alfalfa, the greater quantity of air discharging from the third spigot and through the third hose, the third valve 16 at this time being entirely closed.

A fourth hose is then arranged in a coil on the last deposit of alfalfa and the third valve 16 opened entirely, the third spigot being practically closed as in the first instance and the last or fourth spigot 14 entirely open, which permits a substantial supply of heated compressed air to escape into the alfalfa or other legume, a last deposit of alfalfa having been deposited on the last hose. The stand-pipe as previously stated may be any height and there may be any number of valves 14 and 16, it depending entirely upon the height of the mow, and in which case substantially any amount of alfalfa or other legume can be easily and quickly cured, in very much less time than in any other artificial known method, and it will be further noted that substantial time and labor, with this character of apparatus and method, are saved.

It is obvious that in case the alfalfa or other legume becomes overly heated, it can be easily cooled, by simply detaching the pipes 5 and 11 from the heater, and joining their disconnected ends by means of a coupling nipple, not shown, so as to convey compressed air into the mow. The fact is by the time the air reaches the mow it is of substantial cooling qualities. The air compressor may be any approved type now on the market, one that can be procured at a small cost, while the heater may likewise be of any approved construction as now on the market. The invention resides in the arrangement of the apparatus, and the method, and also the manner of arranging the hose for the purpose of curing the alfalfa or legume. The pipe 5 has a valve 21, whereby the supply of compressed air from the tank 4 can be controlled to the heater.

A by-pass pipe 23 connects the two pipes or conduits 5 and 11, and this by-pass pipe has a valve 21$^a$. The pipe 5 at a point between the heater 6 and one of the upright legs of the by-pass pipe 23 is provided with a valve 21, while the pipe 11 at a point between the heater 6 and the other upright leg of the by-pass pipe 23 is provided with a valve 22. Obviously when the valves 21 and 22 are closed, and the valve 21$^a$ opened, compressed air will enter the standpipe and be carried off through the several hose and into the legume, for cooling it off, in case it has been heated too much.

The pipe 11 has connected to it an injector 24 provided with a valve 25. In case the air passing through the pipe 11 is too hot, it is possible to open the valve 25 of the injector, thereby allowing fresh air from the exterior to be drawn into the pipe 11 and mix with the heated air, thereby reducing its temperature prior to its entering the alfalfa or other legume.

The invention having been set forth, what is claimed is:

1. In an apparatus for curing alfalfa and other legume, the combination with a heater and an air compressor operatively connected to the heater, of a standpipe operatively connected to the heater and provided with a plurality of spigots and a series of intermediate control valves, a hose connected to each spigot and adapted to be arranged in a coil in the deposit of alfalfa or other legume in the mow, the several hose being relatively superposed, in order to cure a substantial supply of alfalfa, each hose having a plurality of outlets for the heated compressed air.

2. An apparatus for curing alfalfa and other legume comprising a standpipe for the reception of heated compressed air, a plurality of hose superposed and communicatively connected with the standpipe, a valved spigot intermediate each hose and the standpipe, and a plurality of valves in the standpipe between the locations of the standpipe for permitting the compressed heated air to pass from the spigot below to the spigot above, when the spigots below are practically shut off, each hose having outlets for the heated compressed air, which acts to cure the alfalfa in the mow and surrounding the several hose.

3. An apparatus for curing alfalfa and other legume consisting of a standpipe and a plurality of superposed hose communicative with the standpipe, means for feeding heated compressed air through the standpipe, the several hose to be imbedded in the legume in the mow, the connection of each hose with the standpipe having means for controlling the supply of heated compressed air, the standpipe having means for permitting the heated compressed air to ascend to the several hose consecutively, each hose having outlets for the escape of compressed heated air.

4. A method for curing alfalfa or other legume comprising sandwiching a plurality of coils of hose and deposits of alfalfa and then feeding step by step consecutively a supply of heated compressed air through the hose and through the several deposits of alfalfa, and then step by step consecutively partially shutting off the supply of compressed air from below through the several deposits of alfalfa.

5. A method for curing a supply of alfalfa, consisting in feeding step by step a supply of compressed heated air from the bottom to the top of a deposit of alfalfa and partially shutting off the supply of such air gradually step by step from the bottom to the top.

6. A method for curing a supply of alfalfa, consisting in feeding step by step a supply of compressed heated air from the bottom to the top of a deposit of alfalfa and partially shutting off the supply of such air gradually step by step from the bottom to the top, and then carrying the entire deposit of alfalfa up a step by step control.

7. An apparatus for curing alfalfa and other legume consisting of a plurality of superposed hose to be imbedded in the legume, means entering a standpipe communicating with the hose for feeding compressed heated air through the several hose, means associated with the standpipe for controlling the compressed heated air, each hose having outlets for the escape of the air, and means for permitting an injection of outside fresh air to mix with the compressed treated air for cooling off the heated air prior to its entering the standpipe.

8. In an apparatus for curing legume, the combination with a standpipe, of a plurality of superposed hose, to be imbedded in the legume, and each having a connection with the standpipe, means for feeding compressed air through the standpipe and thence through the several hose, each hose having outlets for the air, means in each connection for controlling the supply of compressed air, and means in the standpipe for permitting the air to ascend to and through the several hose consecutively.

9. In an apparatus for curing legume, the combination with a standpipe, of a plurality of superposed hose to be imbedded in the legume and each having connection with the standpipe, means having a pipe connection with the standpipe for feeding compressed air to the standpipe, means associated with the pipe connection to heat the compressed air, means in the connection of each hose with the standpipe for controlling the supply of air, each hose having outlets for the air, by-pass means in the pipe connection and having a device for opening or closing the passage through the by-pass means, means associated with the pipe connection for shutting off the compressed air from the heating means, when the device in the by-pass means is open, and means in the standpipe for permitting heated compressed air to ascend to and through the several hose consecutively.

10. In an apparatus for curing legume, the combination with a standpipe, of a plurality of superposed hose to be imbedded in the legume and each having connection with the standpipe, means having a pipe connection with the standpipe for feeding compressed air to the standpipe, means associated with the pipe connection to heat the compressed air, means in the connection of each hose with the standpipe for controlling the supply of air, each hose having outlets for the air, by-pass means in the pipe connection and having a device for opening or closing the passage through the by-pass means, means associated with the pipe connection for shutting off the compressed air from the heating means, when the device in the by-pass means is open, means in the standpipe for permitting heated compressed air to ascend to and through the several hose consecutively, and means for permitting an injection of outside fresh air in through the standpipe.

In testimony whereof he affixes his signature hereto.

HARRY F. GALBRAITH.